United States Patent Office 3,446,208
Patented May 27, 1969

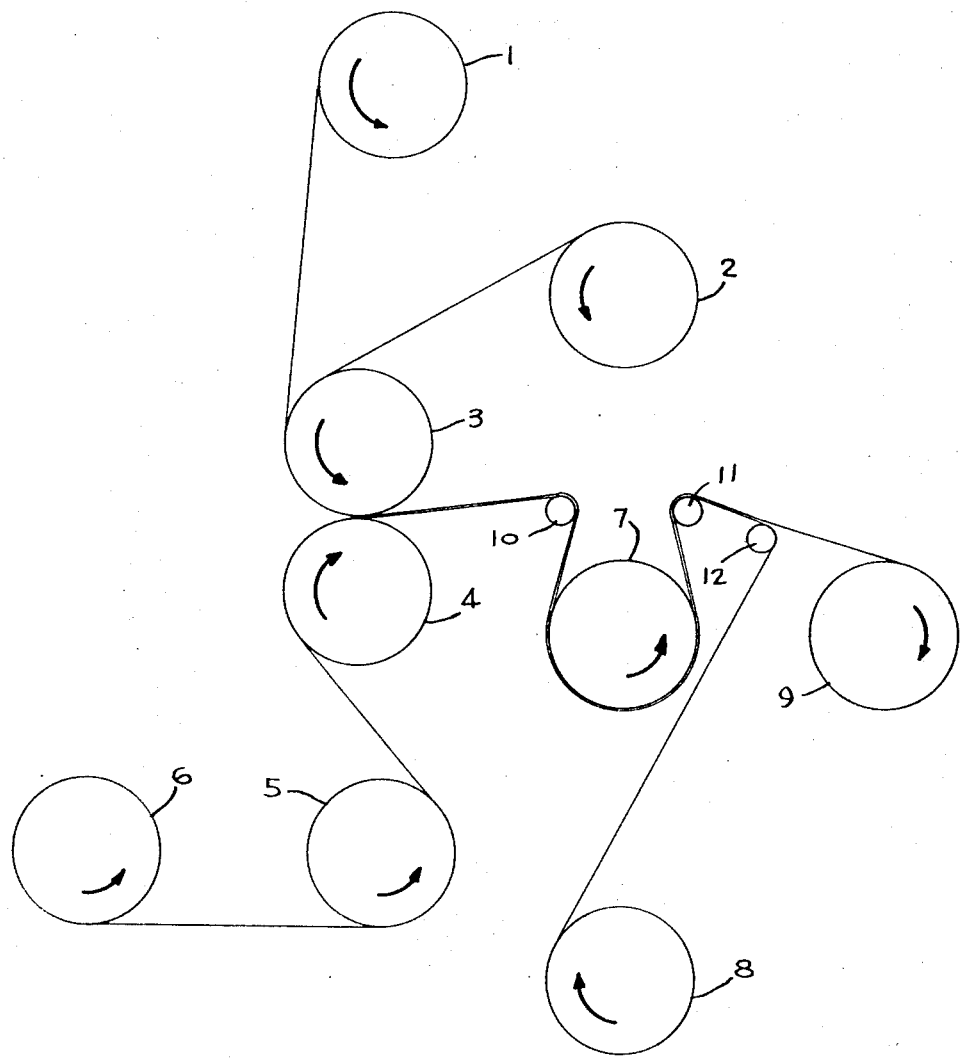

3,446,208
POROUS POLYOLEFIN GAUZE
Tomiichi Fukuda, Tokyo, Japan, assignor to Sumitomo Chemical Company, Limited, Osaka, Japan, a corporation of Japan and Alc Limited, Tokyo, Japan, a corporation of Japan
Filed June 27, 1966, Ser. No. 561,657
Claims priority, application Japan, Aug. 13, 1965, 40/49,429
Int. Cl. A61l *15/00;* A61f *13/00;* B32b *3/10*
U.S. Cl. 128—156        2 Claims

ABSTRACT OF THE DISCLOSURE

A new and useful dressing comprising a cotton gauze on which is laminated a film of polyolefin such as polyethylene and polypropylene, said film having a plurality of small holes on the order of from 0.1 to 3 mm. in diameter. The dressing is prepared by continuously heating and pressing with rolls a perforated film of polyolefin, said film being overlapped with gauze on one side and with a sheet or film of low affinity with respect to the polyolefin on the other side; cooling the resulting laminate and thereafter removing the low affinity sheet or film.

---

This invention relates to a gauze on which is laminated a film of a polyolefin having many small holes made through it and a method of making the same.

Gauzes are used to cover hurt surfaces and ulcerated surfaces in burns, skin transplanting operations or surgical operations.

In curing hurts, it is necessary to eliminate obstacles to natural cure so that the hurts may be cured as soon as possible. One of the various causes of delaying the cure of hurts is a problem of whether the gauze to directly coat the hurt surfaces is good enough or not.

Inherently gauzes are to be used to protect hurt surfaces and to absorb hurt secretions. In order to accelerate the cure of hurt surfaces, it is necessary to quickly absorb hurt secretions so that the hurt surfaces may be prevented from being wet and may be kept dry.

Therefore, when a gauze covering a hurt surface has absorbed blood and secretions and has already lost its absorbing capacity, it must be replaced with a new one.

However, in such case, usually the gauze will have stuck to the hurt surface so tightly due to the blood and secretions as to be hard to peel the gauze off the hurt surface. Therefore, it is not easy to replace the gauze.

When such gauze tightly sticking to the hurt surface is peeled off, not only a pain will be given to the patient but also the hurt surface will be irritated, hurt or opened and the cure will be delayed.

As a result of various investigations made to eliminate such defects, I have discovered that, if a gauze on which is laminated a film of such polyolefin as, for example, polyethylene or polypropylene having many small holes made through it is used with the side of the film of the polyolefin having many small holes made through it applied to a hurt surface, the gauze will not tightly stick to the hurt surface due to blood and secretions, will be easy to replace and will accelerate the cure of the hurt without reducing the inherent secretion absorbing capacity of the gauze.

One object of the present invention is to provide a special gauze which does not tightly stick to hurt surfaces due to blood and secretions, is easy to replace and accelerates the cure of hurt surfaces.

Another object of the present invention is to provide a method of making such special gauze as is described above.

Other objects of the present invention will be clear from the following description.

In order to attain the above mentioned objects, the present invention provides a gauze on which is laminated a film of a polyolefin having many small holes made through it. Further, the present invention provides a method of making a gauze on which is laminated a film of a polyolefin having many small holes made through it, which comprises continuously heating and pressing with rolls a film of a polyolefin having many small holes made through it as overlapped with a gauze on one side of the film and with such paper or film of a low affinity with the polyolefin as, for examples, a glassine sheet, parchment or Teflon film on the other side, cooling them and peeling off the paper or film of a low affinity with the polyolefin. Furthermore, the present invention provides a method of curing hurt surfaces in burns, skin transplanting operations or surgical operations, characterized by using a gauze on which is laminated a film of a polyolefin having many small holes made through it with the side of the film of the polyolefin having many small holes applied to the hurt surfaces.

The thickness of the polyolefin film to be used to make the gauze on which is laminated a film of a polyolefin having many small holes made through it of the present invention (which gauze shall be called the porous polyolefin gauze hereinafter) is 0.01 to 0.1 mm. or preferably about 0.02 mm.

The diameter of the hole made through this film is 0.1 to 3 mm. or preferably 0.6 to 0.8 mm. The number of the holes is 1 to 300/cm.$^2$ or preferably about 50/cm.$^2$. The shape of the hole may be circular or elliptic. It is necessary that the holes should be uniformly distributed. They may be arranged in lattice, diamond or zigzag patterns or may be dispersed quite at random but uniformly.

In making such porous film of a polyolefin or making many small holes through a film of a polyolefin, there are a solvent method and a hot roll method. The solvent method is disclosed in Japanese Patent No. 409,040 and its additional Patent No. 438,510. The hot roll method is disclosed in Japanese Patent Application No. 18,530/63 filed on Apr. 6, 1963. In making many small holes through a film of a polypropylene, the hot roll method is preferable. Needless to say, by such other method as, for example, a mechanically punching method, holes can be made. But, in this method, the small holes once made will return to the original state and will be closed. Therefore, by this mechanically punching method, small holes of a diameter less than 0.8 mm. are difficult to make.

The gauze to be used to make a porous polyolefin gauze of the present invention may be any gauze but may preferably be a cotton gauze. When the product gauze is to be used to cure hurt surfaces and ulcerated surfaces in burns and skin transplanting operations or surgical operations, it is preferable to use a material gauze provided in the Pharmacopoeia.

The method of laminating a porous film of a polyolefin on a gauze shall now be described. It is a feature of the present invention that no binder is required in the method of the present invention. Because of no use of binder, the holes of the porous polyolefin film is not closed with binder, this is another feature of the present invention.

Further, according to the method of the present invention, as the porous film of a polyolefin is laminated on a gauze with hot rolls, there is an advantage that the porous polyolefin gauze is sterilized with heat simultaneously with the lamination in such step. This is also a feature of the present invention.

The method of the present invention is schematically shown in FIG. 1. In FIG. 1, 1 is a roll on which is wound a porous film of a polyolefin, 2 is a roll on which is wound a material gauze and 3 is a silicone roll. 4 and 5 are heating rolls. 6 is a roll on which is wound such sheet or film of a low affinity with the polyolefin as, for example, a glassine sheet, parchment or Teflon film. 7 is a cooling roll. 8 is a roll for winding up the above mentioned sheet or film of a low affinity with the polyolefin. 9 is a roll for winding up a product gauze on which is laminated the porous polyolefin film, that is, a porous polyolefin gauze. 10, 11 and 12 are guide rolls. The arrows indicate the directions of rotations of the rolls.

Now, the case of using a glassine sheet in the case of laminating a porous polypropylene film shall be exemplified. The temperature of the silicone roll 3 is 110° C. The temperature of the heating roll 4 is 200° C. The temperature of the heating roll 5 is 100° C. The pressing pressure between the silicone roll 3 and the heating roll 4 is 1.5 to 2 kg./cm.² The feeding velocity is 5 to 10 m./min.

The porous film of polypropylene and the gauze are overlapped with each other on the silicone roll 3. On the other hand, the glassine sheet is heated with the heating rolls 5 and 4. The material gauze, porous polypropylene film and glassine sheet are overlapped and pressed together between the silicone roll 3 and heating roll 4. In this pressing step, the porous film of polypropylene is laminated on the material gauze. The porous polypropylene film will stick to the material gauze, the glassine sheet will cover the surface of the porous polypropylene film so as to prevent the roll and film from sticking to each other and the porous polypropylene film will come to be inserted between the material gauze and glassine sheet as in a sandwich. Then this gauze is cooled with the cooling roll 7. Then, at the guide roll 12, the glassine sheet is peeled off the porous polypropylene gauze. The product porous polypropylene gauze is wound up on the roll 9. The glassine sheet which has been used and peeled off is wound up on the roll 8.

The conditions for laminating a porous film of polyethylene on a gauze are the same as the above-mentioned conditions except that the temperature of the heating roll 4 is 160° C.

Even if the material gauze and the porous film of the polyolefin are directly heated and pressed, the film will not be well laminated, because the projecting fibers of the gauze will be likely to stick to the silicone roll 3 through the holes in the porous film of the polyolefin. Further, as a product, it is desirable that the surface of the porous film of the polyolefin of the porous polyolefin gauze is smooth. In case the material gauze and film are directly heated and pressed, the projecting fibers of the material gauze will come out on the surface of the porous film of the polyolefin, the surface will not become smooth and therefore the result will not be favorable. The porous film of the polyolefin can be easily laminated on the material gauze by a method wherein the porous film of the polyolefin is heated and pressed as overlapped with such sheet or film of a low affinity with the polyolefin as a glassine sheet and is cooled and then the paper or film of a low affinity with the polyolefin is peeled off. Here is a feature of the present invention. A parchment or Teflon film can be used instead of the glassine sheet. In short, anything which is smooth on the surface and can be peeled off by cooling even if it sticks to the polyolefin film when heated and pressed, or has a low affinity with the polyolefin can be used.

It is possible and advantageous to use a Teflon film continuously as in an endless belt.

The porous polyolefin gauze of the present invention can be used for various use.

That is to say, it can be used to wrap such things requiring ventilation and moisture passage as, for example, fruits and foods. It is also very convenient to place such porous polyolefin gauze on a bamboo blind in a bun steamer. However, in case it is used to coat or drain hurt surfaces and ulcerated surface in burns, skin transplanting operations or surgical operations, it will be most effective.

The porous polypropylene gauze can endure boiling sterilization at 100° C. for 30 to 120 minutes or high pressure steam sterilization at 120° C. under 2 atmospheres for 15 to 30 minutes. Therefore, it is sterilized by either of them before it is used.

As the porous polyethylene gauze is a little weaker to heat, it is better to sterilize the gauze with a sterilizing gas or liquid than with boiling or high pressure steam. As an example of gas sterilization, there is a method of sterilization with an ethylene oxide gas of a concentration of 700 mg./liter at 50° C. under a relative humidity of 30 to 50% for 3 hours.

In case it is to be used, the porous polypropylene gauze or porous polyethylene gauze is cut into a proper size and is applied directly so that the film side may be in contact with the hurt surface or is applied after a medicine is applied to the hurt surface and then an ordinary gauze is placed on it. When such porous polyethylene gauze or porous polypropylene gauze is to be used as a drain, it is cylindrically rolled in the form of a cigar with the film surface of polypropylene or polyethylene directed outward and is inserted. When it is to be removed, it will not stick to the hurt part at all and can be removed without giving any pain to the patient.

In order to more comprehensibly explain the present invention, examples shall be given in the following. However, they are to explain the present invention and it is not intended to limit the invention to them.

*Example 1*

A polypropylene film 0.02 mm. thick and having many circular holes of a diameter of 0.7 mm. made in lattice patterns at a rate of 50 holes/cm.² through it was laminated on a gauze of the Pharmacopoeia. In the lamination, a glassine sheet was used, the temperature of the silicone roll 3 in FIG. 1 was 110° C., the temperature of the heating roll 4 was 200° C., the temperature of the heating roll 5 was 100° C., the pressing pressure between the silicone roll 3 and the heating roll 4 was 1.8 kg./cm.² and the feeding velocity was 10 m./min. Thus a gauze on which was laminated the film of polypropylene having many small holes made through it or a porous polypropylene gauze was obtained.

*Example 2*

The gauze obtained in Example 1 was sterilized by boiling at 120° C. under 2 atmospheres for 50 minutes and was then used to cure an inflamed surface of a hot hurt. No such irritation as was thought to be caused by the porous polypropylene gauze was felt in the position coated with the gauze. Secretions were well absorbed and the inflamed surface was not wetted. In case the porous polypropylene gauze was to be peeled off the inflamed surface, it did not stick to the surface so tightly as to be hard to peel off.

*Example 3*

Instead of the porous polypropylene film used in Example 1, a polyethylene film having the same thickness and holes as in the above was laminated in the same manner as in Example 1 except that the temperature of the heating roll 4 was changed to 160° C. Thus a porous polyethylene gauze was obtained.

*Example 4*

The porous polyethylene gauze obtained in Example 3 was sterilized with an ethylene oxide gas of a concentration of 700 mg./liter at 50° C. for 3 hours. The long porous polyethylene gauze sterilized as mentioned above was rolled like a cigar and was used as a drain to stop bleeding by pressing and to discharge hurt secretions in a surgical operation of an internal organ cancer in a pelvis forming a wide cavity. It little stuck to the cut part and a fear of bleeding in the deep part after the drain was pulled out was little.

What I claim is:

1. A cotton gauze on which is laminated a film of polyolefin selected from the group consisting of polyethylene and polypropylene, said film being 0.01 to 0.1 mm. thick and having 1 to 300 holes per $cm.^2$, said holes being 0.1 to 3 mm. in diameter.

2. A method of laminating a film of polyolefin selected from the group consisting of polyethylene and polypropylene, said film being 0.01 to 0.1 mm. thick and having 1 to 300 holes per $cm.^2$, said holes being 0.1 to 3 mm. in diameter, which comprises continuously heating and pressing with rolls said film, said film being overlapped with cotton gauze on one side and on the other side with a sheet of low affinity with respect to said film selected from the group consisting of glassine, parchment and polytetrafluroethylene; cooling the resulting product, and thereafter removing said low affinity sheet.

References Cited

UNITED STATES PATENTS

| | | | |
|---|---|---|---|
| 2,432,541 | 12/1947 | Peck | 128—268 |
| 2,923,298 | 2/1960 | Dockstader et al. | 128—296 |
| 3,292,619 | 12/1966 | Egler | 128—156 |
| 3,331,728 | 7/1967 | Lane | 161—112 |

ADELE M. EAGER, *Primary Examiner.*

U.S. Cl. X.R.

117—161; 128—296; 156—210; 161—112